United States Patent [19]

Gurney et al.

[11] 4,258,841

[45] Mar. 31, 1981

[54] CHAIN BRACKET WITH STRENGTHENED CHAIN SUPPORTS

[75] Inventors: Gerald W. Gurney, Ada; Siegfried K. Weis, Byron Center, both of Mich.

[73] Assignee: C. L. Frost & Son, Inc., Grand Rapids, Mich.

[21] Appl. No.: 872,265

[22] Filed: Jan. 25, 1978

[51] Int. Cl.³ .................. B65G 17/20; B65G 17/32
[52] U.S. Cl. ................................. 198/687; 104/95; 105/154; 248/317
[58] Field of Search ................. 104/89, 91, 94, 95, 104/172 S, 93; 198/477, 683, 684, 685, 687; 105/148, 154, 155, 150; 248/300, 317, 323, 340; 16/90, 94 R; 29/150, DIG. 21; 308/241

[56] References Cited

U.S. PATENT DOCUMENTS

| | | | |
|---|---|---|---|
| 625,427 | 5/1899 | Stewart et al. | 29/150 |
| 1,375,509 | 4/1921 | Heatlie | 29/150 |
| 1,702,803 | 2/1929 | Webb . | |
| 1,721,316 | 7/1929 | Pribil . | |
| 1,721,759 | 7/1929 | Webb . | |
| 1,806,913 | 5/1931 | Paquette . | |
| 1,906,097 | 4/1933 | Pribil | 198/687 |
| 2,075,261 | 3/1937 | Bishop . | |
| 2,095,022 | 10/1937 | Bishop . | |
| 2,101,951 | 12/1937 | McInnis . | |
| 2,133,391 | 10/1938 | Lemmon . | |
| 2,242,065 | 5/1941 | Gaboury . | |
| 2,265,248 | 12/1941 | Pomeroy | 198/682 |
| 2,283,359 | 5/1942 | Gaboury . | |
| 2,398,062 | 4/1946 | Webb et al. . | |
| 2,411,906 | 12/1946 | Suman . | |
| 2,517,652 | 8/1950 | Gaboury . | |
| 2,552,897 | 5/1951 | Lemmon . | |
| 2,644,571 | 7/1953 | Webb et al. . | |
| 2,780,178 | 2/1957 | Zebley | 105/148 |
| 2,816,643 | 12/1957 | Klamp . | |
| 2,830,694 | 4/1958 | Zebarth . | |
| 2,853,955 | 9/1958 | Bishop et al. | 104/88 |
| 2,892,419 | 6/1959 | King | 105/155 |
| 2,931,486 | 4/1960 | Zebarth . | |
| 2,956,514 | 10/1960 | Bishop | 104/128 |
| 3,231,067 | 1/1966 | Gaboury et al. . | |
| 3,268,062 | 8/1966 | Gladstone . | |
| 3,420,188 | 1/1969 | Deane et al. | 104/172 S |
| 3,777,872 | 12/1973 | Rikman et al. . | |
| 3,854,573 | 12/1974 | Freier, Sr. | 104/172 S X |
| 3,971,601 | 7/1976 | Sytsma | 104/95 X |

FOREIGN PATENT DOCUMENTS

| | | | |
|---|---|---|---|
| 1370208 | 7/1964 | France . | |
| 583531 | 10/1958 | Italy | 198/687 |
| 304124 | 3/1955 | Switzerland . | |
| 617534 | 4/1949 | United Kingdom . | |
| 706349 | 3/1954 | United Kingdom . | |
| 708935 | 5/1954 | United Kingdom . | |
| 835356 | 5/1960 | United Kingdom | 29/DIG. 21 |
| 852153 | 10/1960 | United Kingdom | 198/683 |
| 1025022 | 4/1966 | United Kingdom | 104/93 |
| 1180133 | 2/1970 | United Kingdom . | |
| 1466703 | 3/1977 | United Kingdom . | |
| 438589 | 1/1975 | U.S.S.R. . | |

OTHER PUBLICATIONS

"Conveyors", A. B. Farquhar Division Of Conveyor Systems Inc.
"Ball Bearing Trolleys", Link-Belt Material Handling Systems Division of FMC Corp., 1972.
"Frost Food Handling Products", C. L. Frost & Son, Inc., 1975.

*Primary Examiner*—Randolph A. Reese
*Attorney, Agent, or Firm*—Price, Heneveld, Huizenga & Cooper

[57] ABSTRACT

An improved chain bracket and especially a trolley bracket for use in overhead conveyor systems including a strengthened chain support structure. The bracket is stamped from sheet metal but includes chain support pads formed separately and secured to the stamped bracket by welding or the like. In one embodiment, reinforcing members back up at least some of the chain pads to resist bending and deformation when the pads support a conveyor chain link under load. Alternately, the chain pads can be bent in one piece from the bracket sheet metal and reinforced with separate rigid bars or triangular supports welded or otherwise fastened to the stamped bracket preferably intermediate upstanding marginal side edge flanges which help stiffen, rigidify and strengthen the bracket. The separate pads or reinforcing members can be made from harder, more wear resistant materials than the remainder of the bracket.

22 Claims, 8 Drawing Figures

CHAIN BRACKET WITH STRENGTHENED CHAIN SUPPORTS

BACKGROUND OF THE INVENTION

This invention relates to chain brackets, and especially to trolley brackets for supporting loads in overhead conveyor systems, which brackets are connected to conveyor chains. More particularly, the invention is an improved chain or trolley bracket which is more economical to manufacture because it is stamped from sheet metal and yet includes increased chain support strength.

Trolley and other chain brackets used in overhead conveyor systems are typically subjected to many stresses and strains. In a manufacturing plant utilizing an overhead conveyor, the conveyor usually includes numerous horizontal corners as well as changes in vertical height along its length. Each trolley bracket, which is typically supported by a wheel assembly on an overhead I-beam or other type conveyor rail or the like, is joined to a conveyor chain which extends along the conveyor rail by means of one of the chain links. A typical method is to insert a pair of trolley brackets through the open center of the link in back-to-back fashion and thereafter move the brackets outwardly with a spacer and secure them with bolts or the like to hold the link in place on the brackets. Other chain brackets, such as those typically fitted between trolley brackets, are also secured to the chain in a similar fashion.

When each combination of brackets and a chain link encounters turns in the conveyor and especially vertical changes in height, the chain changes direction urging the bracket connected links through that same change in direction. This tends to cause the rigidly mounted links to "rock" on the brackets resulting in wear to or deformation of the chain and brackets.

One prior known type of trolley bracket was forged from steel or another metal. The forging method is tremendously more expensive because it is labor intensive and requires numerous forging dies. Such dies tend to wear out quickly because of extensive configurations and projections in the trolley bracket to be formed. A forged bracket also includes metal which has to be softened by heating to allow forging, is heavier than a stamped sheet metal bracket, is more expensive to heat treat for hardness after forging, and requires secondary machining before use.

Other prior trolley brackets were stamped from sheet metal. Some of these brackets included chain support surfaces which were bent out of the sheet metal itself. Such chain supports often bent and were deformed when stressed during use on a conveyor and subjected to the above "rocking" link motion. Also, some of the prior stamped trolley brackets supported the chain only with sheared edges of the stamped metal itself which increased wear on the chain.

In addition, prior known forged or stamped trolley brackets utilized the same metal for supporting the chain links as was included in the remainder of the bracket. Because the chain support areas of the bracket are subjected to a great deal more stress, load and wear than are other portions of the bracket, the chain support areas typically failed first, necessitating replacement of the entire brackets. Use of different materials in the chain support areas for hardening of the chain supports without treating or effecting the remainder of the bracket was extremely difficult or impossible. Moreover, using sufficiently wear-resistant material for the entire bracket was prohibitively expensive.

Accordingly, a need was evident for an economical chain bracket, and especially a trolley bracket for use with overhead conveyors which would be stronger and more durable in use and could include chain supports which would resist wear and deformation during use and be formed from different materials than the remainder of the bracket if desired. This invention provides a solution to the above problems. Other inventions providing other distinct, strengthened trolley brackets are disclosed in copending, commonly assigned U.S. patent applications, Ser. No. 872,244, invented by Charles C. Frost and Siegfried K. Weis and Ser. No. 872,245, now U.S. Pat. No. 4,210,238, invented by Charles C. Frost, Gerald W. Gurney and Frederick R. Sytsma, both of which were filed on even date herewith.

SUMMARY OF THE INVENTION

Accordingly, the present invention provides improved chain brackets, and especially trolley brackets for use with overhead conveyors adapted to be primarily formed from sheet metal for lower cost yet including strengthened chain supports or pads, and in some embodiments, reinforcing portions for such pads, which are formed from pieces separate from the stamped bracket and secured in rigid relationship with the bracket. The chain pads or reinforcing portions, depending on the embodiment, are formed from metallic materials welded or otherwise fastened to the stamped bracket and having thicknesses or widths greater than the sheet metal from which the remainder of the bracket is formed. The separate chain pad or reinforcing member materials may also be made from harder, more wear resistant materials than is the remainder of the bracket without greatly increasing the overall cost of the bracket. In addition, principal support for the chain adapted to be connected to the bracket is provided by smooth, uncut metal surfaces so that primary support by edges of the sheet metal which could cause greater wear on the chain as was common in prior known stamped brackets is avoided. The necessity for forming the entire bracket from more expensive, harder materials is thereby avoided.

In one form, the invention provides a trolley bracket having a first end including means for supporting a trolley wheel, a second end opposite the first and including chain link support means for supporting a link of a conveyor chain, and an intermediate portion connecting the two ends. Means for securing the bracket to a bracket attachment or another of the brackets are included. The trolley bracket is stamped from sheet metal. The chain link support means include a rigid, chain support member having a chain link support surface for one side edge of a chain link extending continuously across and engaging the second bracket end portion transverse to the direction of elongation of the bracket. Preferably, the support member is a metallic bar having a width greater than the thickness of the bracket sheet metal. The chain link support means also include means spaced from the continuous chain link support surface in the direction of elongation of the bracket for supporting a second side edge of the chain link.

The bracket may also include marginal edge flanges extending along at least the side edges of said second bracket end portion which are interrupted along each side and have opposing, aligned end surfaces forming the interruptions and defining a chain link receiving space. In this case, the chain support member has a chain link engaging surface flush with a pair of the marginal edge flange end surfaces to form a continuous chain link support surface for supporting one side edge of a chain link.

In other forms, the invention may be a chain bracket for attachment to a chain and include a chain pad and/or reinforcement means for the chain pad as described herein.

In another form, the improved bracket includes a planar area at one end of the bracket while at least one chain support pad extends outwardly from the bracket sheet metal and generally perpendicular to the bracket end portion and having a chain link engaging surface extending generally transverse across the bracket for supporting one side edge of the chain link. A rigid, reinforcing member which is formed separately is secured against and abuts the surface of the chain pad opposite the chain link engaging surface and against the bracket end portion with a surface extending parallel to the chain link engaging surface. The reinforcing member resists bending and deformation of the chain pad when a chain link is supported thereby under load. Means spaced in the direction of elongation of the bracket from the chain pad are provided for supporting a second side edge of the conveyor chain link.

In other aspects, the chain support pad or pads may be formed by a continuous, rigid, metal bar or triangular shaped pieces both of which have thicknesses greater than that of the bracket sheet metal. Alternately, the chain pads may be bent from the bracket sheet metal and reinforced by the thicker continuous bar or separate reinforcing members.

These and other objects, advantages, purposes and features of the invention will become more apparent from a study of the following description taken in conjunction with the drawings.

BRIEF DESCRIPTIONS OF THE DRAWINGS

DESCRIPTION OF THE PREFERRED EMBODIMENT

Figure 1:
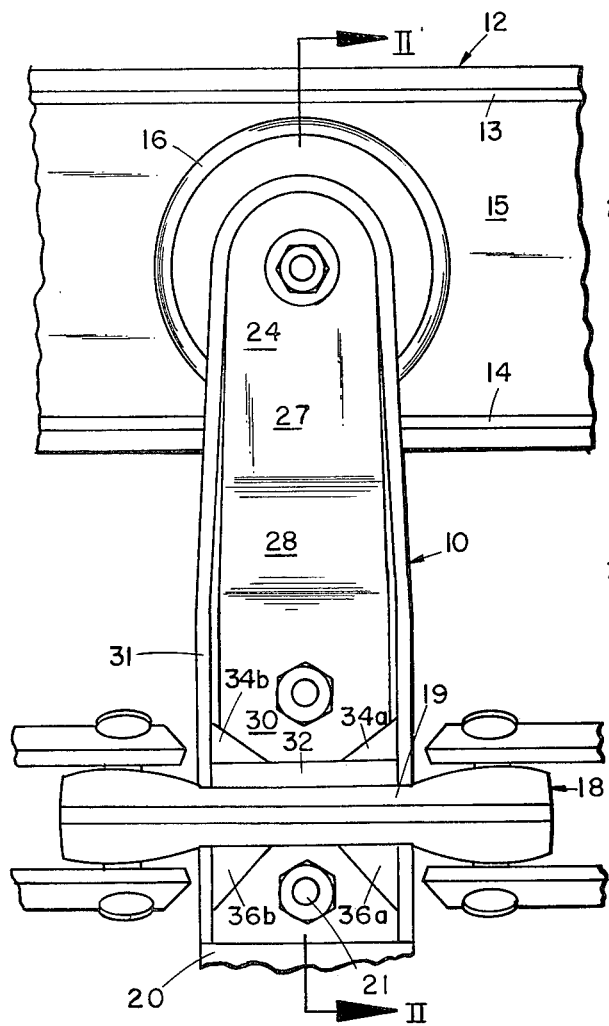
FIG. 1 is a fragmentary, front elevation of an overhead conveyor including the improved trolley bracket of the present invention.
Figure 2:
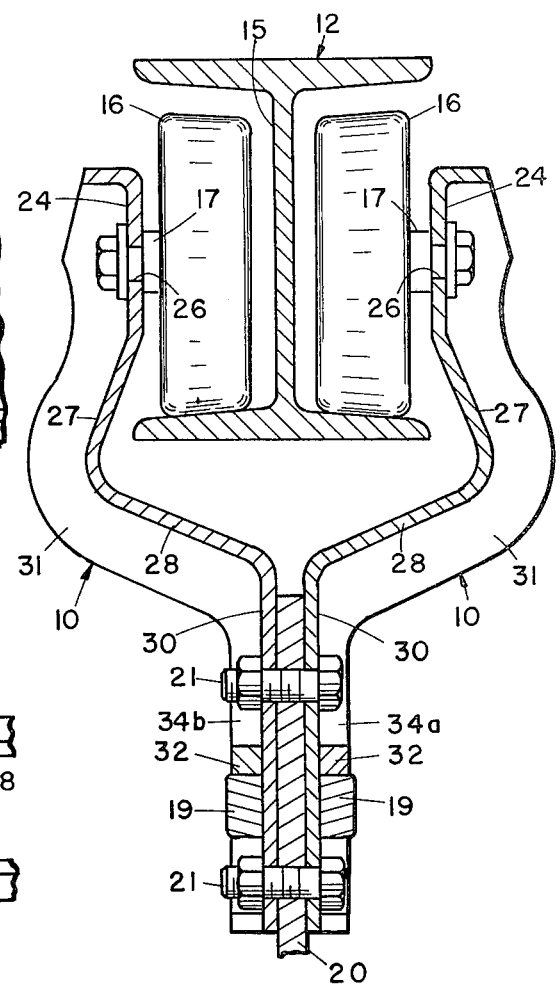
FIG. 2 is a fragmentary, sectional, side elevation of the trolley bracket assembled with an identical bracket in an overhead conveyor and taken along plane II—II of FIG. 1.

Referring now to the drawings in greater detail, FIGS. 1 and 2 illustrate one embodiment of the improved, strengthened, reinforced trolley bracket 10 of the present invention assembled in a typical, overhead conveyor system. The overhead conveyor system includes an I-beam-type overhead support rail 12. Beam 12 includes upper and lower, laterally extending flanges 13, 14 connected by a central wall or vertical flange 15. Lower flange 14 supports one trolley wheel assembly 16 on either side of central wall 15, each wheel assembly 16 including a laterally outwardly extending axle 17 bolted to the upper end of one of the improved trolley brackets 10 of the present invention. The brackets themselves extend downwardly and curve inwardly around flange 14 to a position adjacent one another for receipt of a link from the conveyor chain which moves the brackets and wheel assemblies along the rail 12.

Each pair of brackets 10 is received through the center opening of the central chain link 18 which has parallel side portions 19. Side portions 19 are supported and prevented from moving vertically or in a "rocking" motion by chain pads 32, 36a and 36b secured on the lower end of the brackets as will be more fully described hereinafter.

The bracket lower ends are individually inserted through the central opening in the chain link 18 and moved outwardly to engage side portions 19 after which a central spacer or bracket attachment 20 is inserted between the trolley brackets 10. Securing bolts 21 are passed through the aligned apertures in the brackets and bracket attachment to secure the entire assembly in place. As is best seen in FIG. 2, the spacer or bracket attachment 20 extends downwardly beyond the lower ends of the brackets and may include an additional aperture or other means for suspending a shackle, support, hanger or the like to support an object on the conveyor.

Figure 3:
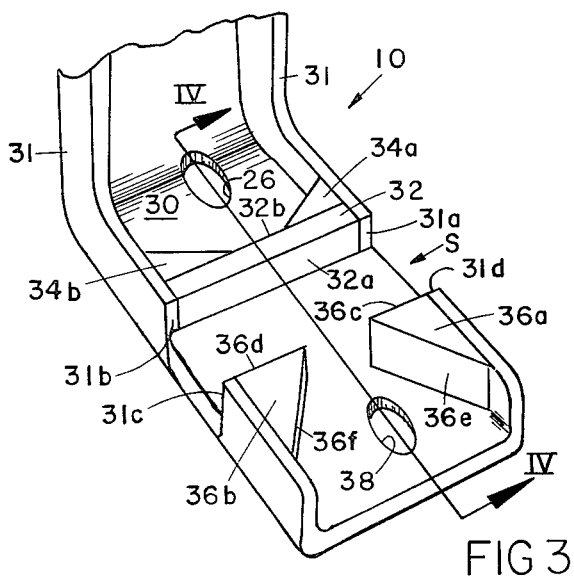
FIG. 3 is a fragmentary, perspective view of the chain supporting end of the trolley brackets shown in FIGS. 1 and 2.
Figure 4:
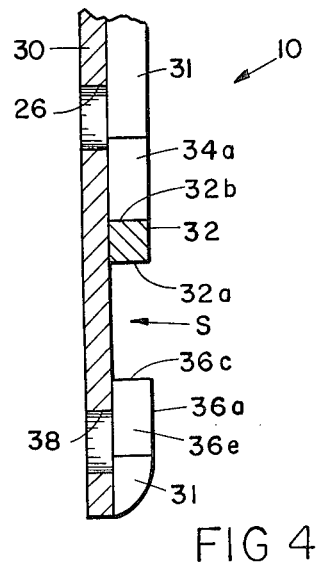
FIG. 4 is a fragmentary, sectional side elevation of the bracket of FIGS. 1-3 taken along line IV—IV of FIG. 3.

As is best seen in FIGS. 3 and 4, the trolley bracket 10 is a continuous, elongated body stamped from sheet steel, sheet stainless steel or other metal typically having a thickness of approximately 0.125 inches. The designed thickness of the sheet metal can be increased or decreased depending on the load required to be supported by the brackets. Each bracket 10 includes a first or upper end 24 having an aperture 26 centered therein for receiving axle 17 of one of the wheel assemblies 16 as shown in FIGS. 1 and 2. The bracket upper end angles slightly outwardly at 27 around the lower flange 14 of rail 12 and merges with a connecting portion 28 extending inwardly and downwardly from the lower end of the upper portion. Connecting portion 28 merges with a continuous, downwardly extending lower or second end 30 of the bracket which is generally planar between its side edges and extends generally parallel to the portion of the upper end 24 which includes aperture 26.

Each bracket 10 also includes an upstanding, marginal edge flange 31 extending continuously along the peripheral edges of the bracket except for relieved areas aligned with one another transversely across the bracket lower end 30 to provide a space S for receiving one side portion 19 of a chain center link 18. Space S is slightly wider than the width of the one side portion 19 of link 18. Flanges 31 provide strength and rigidity for the formed bracket and are bent and formed in one piece with the remainder of the bracket by stamping. Flanges 31 include end surfaces 31a, 31b, 31c, 31d at the interrupted or relieved areas defining space S. End surfaces 31a and 31b are parallel and aligned with one another across the bracket as are surfaces 31c and 31d. End surfaces 31a and 31d are aligned with and face one another lengthwise of the bracket as do surfaces 31b and 31c.

Support for the upper edge of link sides 19 of link 18 is provided on each bracket by a continuous, rigid, elongated, metallic bar 32 forming a chain support or pad extending entirely across the bracket between the inner side surfaces of marginal edge flanges 31 on the upper side of the space S. Bar 32 is preferably substantially square in cross section (FIG. 4) and is thicker, and wider than the thickness of the bracket sheet metal from which bracket 10 is stamped and is thus stronger than the bracket sheet metal. Bar 32 includes a chain link engaging surface 32a which is flush with marginal side edge flange end surfaces 31a, 31b when the bar is secured in place, preferably by welding to the lower bracket portion via its side which is opposite chain link engaging surface 32a and to the marginal side edge flanges 31 via its ends. As is best seen in FIGS. 3 and 4, the thickness of bar 32 corresponds to the height of marginal edge flanges 31 so that the outermost surfaces are flush. Bar 32 engages lower bracket planar portion 30 intermediate flanges 31 and thus provides a continuous support for the upper side of the chain link side 19. Such continuous extent of the chain pad provides a larger wear surface which lengthens the life of the bracket. Even though end surfaces 31a and 31b of marginal side edge flanges 31 are sheared or cut surfaces of the sheet metal, primary support for the chain link is provided by the smooth side 32a of support pad bar 32. Accordingly, undue wear on the chain link upper side is avoided.

Reinforcement for bar 32 is provided by triangular braces or reinforcing members 34a, 34b. Braces 34a and 34b are rigidly secured by welding or the like between the inside surfaces of marginal side edge flanges 31 and the side surface 32b of bar 32 which is opposite the chain link engaging side surface 32a. Braces 34 support the areas of bar 32 which are spaced inwardly toward the center of the bracket from marginal side edge flanges 31 to resist bending and deformation of the bar 32 when a conveyor chain link is mounted on the bracket and supported under load. These braces are equivalent in thickness to bar 32 and their top surfaces are flush with the edges of flanges 31.

Support for the lower edge of side 19 of a chain link is provided by a pair of spaced triangular chain link support pads 36a, 36b as shown in FIGS. 3 and 4. Pads 36a and 36b are generally triangular in shape and have thicknesses equal to the height of the marginal edge flanges 31 so that the tops of the pads and the outermost surfaces of the marginal edge flanges are flush. Pads also include chain link engaging surfaces 36c, 36d which are parallel to surface 32a of bar 32 and each extend flush and are aligned with one of the marginal side edge flange end surfaces 31c and 31d. Thus, surface 36c is flush with end surface 31d while surface 36d is flush with end surface 31c. Pads 36 taper toward side flanges 31 and include inwardly facing side surfaces 36e, 36f, forming the hypothenuse of the triangle which extend between the innermost end of the chain link engaging surfaces 36c, 36d and the inside surfaces of the marginal side edge flanges as shown in FIG. 3. The area between the pads 36 which widens downwardly toward the lower end of the bracket provides a space through which an aperture 38 is formed allowing securing of the bracket to another bracket and an intermediate space as is shown in FIG. 2. The tapering configuration of the pads 36 also provides room for receipt of a bolt head or nut as shown in FIG. 1. In addition, the triangular shape also braces the innermost ends of the chain link engaging surfaces 36c, 36d for support of the link.

Figure 5:
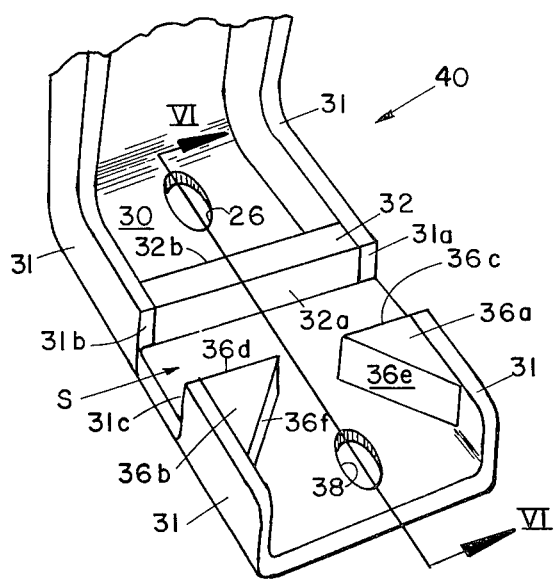
FIG. 5 is a fragmentary, perspective view of the lower chain supporting end of a modified embodiment of the improved trolley bracket.
Figure 6:
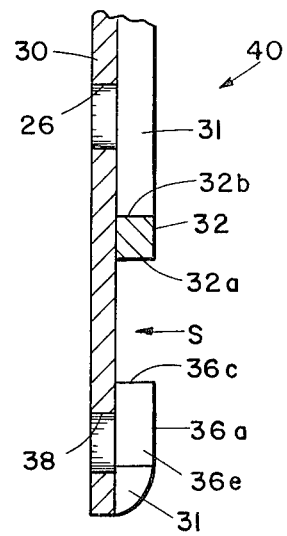
FIG. 6 is a fragmentary, sectional, side elevation of the trolley bracket taken along line VI—VI of FIG. 5.

A second embodiment 40 of the improved trolley bracket of the present invention as shown in FIGS. 5 and 6 wherein like numbers indicate like parts. The principal difference between embodiments 10 and 40 is the elimination of reinforcing members or triangular braces 34 in embodiment 40. In this embodiment, if desired, for proper support and wear resistance, bar 32 may be formed from a higher carbon containing steel, such as 1035 steel, for greater hardness and rigidity and thus greater resistance to bending, deformation and wear during use. Likewise, chain supports 36a, 36b may also be formed from the same higher carbon material if desired. Also, a continuous rigid bar could be used in place of chain pads 36 either with or without reinforcing members as shown at 34 in FIGS. 3 and 4, if desired.

Figure 7:
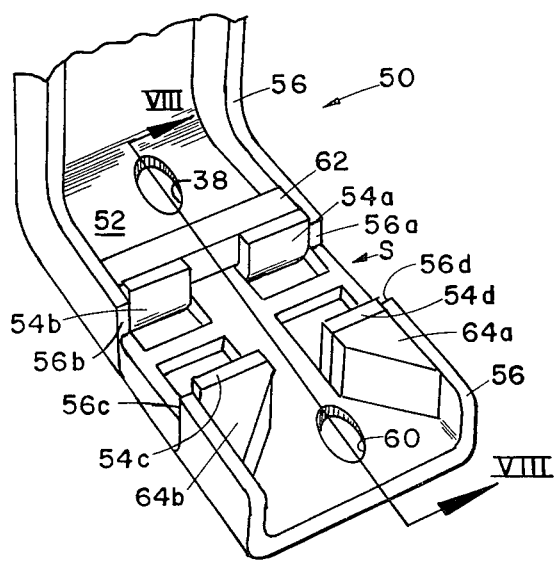
FIG. 7 is a fragmentary, perspective view of the lower chain supporting bracket end of a modified version of the improved trolley bracket.
Figure 8:
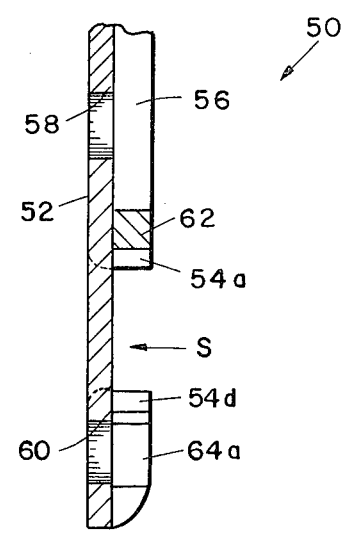
FIG. 8 is a fragmentary, sectional, side elevation of the trolley bracket taken along line VIII—VIII of FIG. 7.

As shown in FIGS. 7 and 8, a third embodiment 50 of the improved trolley bracket is also stamped from sheet steel but includes reinforcing members for the chain pads which are bent out of the planar sheet metal of the bracket. Bracket 50 includes first or upper ends and a connecting portion similar to those described for bracket 10 and has a similar overall configuration. The principal difference between embodiments 50, 40 and 10 is the lower bracket portion 52 which is planar as in the other embodiments but includes a different chain support arrangement. Support for the side 19 of a chain link 18 is provided by four spaced but parallel chain pads 54a, 54b, 54c and 54d bent perpendicularly outwardly from the planar sheet metal of the bracket. The openings from which the chain pads 54 are bent in the lower bracket portion do not effect the strength of the bracket since the principal load is borne by the bolts passing through apertures 58, 60, spaced at the upper and lower ends of the lower bracket portion as shown in FIG. 7 and spacer or attachment 20. Stamped marginal side edge flanges 56 formed in one piece with the remainder of the bracket include end surfaces 56a, 56b, 56c, 56d which are aligned with and parallel to one another, opposing pairs of which face one another to define link receiving space S along with chain pads 54. Each chain pad is immediately adjacent one of the marginal side edge flanges and end surface thereof, and is flush therewith. The chain link engaging surface of pad 54a is flush with marginal side edge flange end surface 56a and so on.

Because chain pads 54 are formed from only the thin sheet metal of the bracket, reinforcing members are provided to resist and prevent bending and deformation of the pads when supporting a chain link under load. For the upper pair of aligned chain pads 54a, 54b, a rigid, elongated bar 62 is provided and secured to bracket portion 52 between the inner side surfaces of marginal side edge flanges 56. Bar 62 has a surface 62a engaging the rear surfaces of chain pads 54a, 54b opposite the chain link engaging surfaces of those pads and also is in direct contact with the planar lower bracket portion 52. Bar 62 thus supports the entire length of each pad 54a, 54b, and has a thickness and width greater than the thickness of the sheet metal for secure support of the pads. Bar 62 corresponds in thickness to the height of side edge flanges 56 which are flush with the top of the bar.

Reinforcing support for the lower chain pad supports 56c, 56d is provided by a pair of spaced, generally triangular reinforcing members 64a, 64b which are mirror images of one another. Each triangular brace or reinforcing member 64 includes a pad engaging surface parallel to the chain link engaging surfaces of the chain pads which abuts the rear surface opposite to those chain link engaging surfaces. The hypothenuse of the triangular brace faces inwardly and tapers generally from the outer edge of the chain support pad, which it engages, downwardly and outwardly toward the marginal side edge flange 56. The space between the reinforcing members 64 allows receipt of a bolt head or nut in the manner shown in FIGS. 1 and 2. Bar 62 and triangular braces 64 are preferably welded into place against the inside surfaces of the marginal side edge flanges 56 and against their respective chain support pads as well as being in direct engagement with the planar lower bracket portion 52. Thus, each support pad is supported over its entire length to prevent and/or resist bending and deformation during use.

As mentioned above, the chain pads and/or reinforcing members in bracket embodiments 10, 40 and 50 can be formed from materials which are harder, more durable and more wear resistant than is the remainder of the stamped bracket. This allows use of softer, more ductile sheet metal which can be more easily stamped and formed while providing the ability to include stronger, more wear resistant chain support areas in the finished bracket. One type of sheet steel found useful is nominal ⅛ inch 1010 sheet steel. After stamping and bending, the separately formed chain pads and reinforcing members 32, 34, 36 or 62, 64 can be welded on the brackets after being separately formed. The entire brackets are then surface or case hardened by carburizing, which includes heating them to approximately 1500° to 1550° F. in a furnace while inducing carbon into the furnace atmosphere. The carbon enters the metal surfaces for greater hardness.

Alternately, higher carbon 1035 sheet steel can be stamped and bent while the chain pads and reinforcing members can be separately formed from 1035 steel stock or even higher carbon more wear resistant 1050 steel stock and welded in place. The brackets are then surface-hardened by heating to approximately 1500° to 1550° F. followed by quenching in an ambient temperature oil bath. Although the above surface-hardening steps could be performed on prior known forged brackets, it was more difficult and expensive to do so than with the present stamped brackets because of the surface configuration of the forged parts. In addition, with both prior known forged and stamped brackets, there was no way to utilize separately formed harder materials for the chain support areas.

Accordingly, the present invention provides support for side areas of center chain links by utilizing continuous, rigid bars extending across the width of the trolley brackets or spaced support pads welded on the brackets either of which can be made from harder, more wear resistant materials than the bracket sheet metal. Alternately, chain pads formed from the stamped bracket itself are supported with either the separate or continuous reinforcing members which can be formed from harder, more wear resistant materials than the brackets themselves.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. In a trolley bracket for use in overhead conveyors including a first end portion including means for supporting a trolley wheel thereon, a second end portion opposite said first end and including chain link support means for supporting a link of a conveyor chain, an intermediate portion connecting said first and second end portions, and means for securing said bracket to a bracket attachment or another of said brackets, said bracket being elongated in a direction between said ends the improvement comprising:

a trolley bracket stamped from sheet metal having upstanding marginal side edge flanges extending along at least the side edges of said second bracket end portion;

said chain link support means including a rigid chain support member extending continuously across and engaging said second bracket end portion transverse to said direction of elongation of said bracket and secured between the inside surfaces of said marginal side edge flanges, said rigid chain support member being formed separately from said bracket and permanently affixed to said second bracket end portion between said marginal side edge flanges and formed from material which is harder and more wear resistant than said bracket sheet metal;

said marginal side edge flanges being interrupted at aligned positions along each side edge and having opposing, aligned, end surfaces forming said interruptions and defining a chain link receiving space;

said chain support member having a chain link engaging surface flush with a pair of said marginal side edge flange end surfaces to form a continuous chain link support surface for supporting one side edge of a chain link;

said chain link support means including means spaced in the direction of elongation of said bracket from said continuous chain link support surface and across said chain link receiving space for supporting a second side edge of a chain link; said means for supporting a second side edge of said chain link include a pair of spaced, triangular chain support pads, each pad secured against said second bracket end portion and an inside surface of said marginal side edge flange, each pad having a chain link engaging surface flush with one of said marginal side edge end surfaces and aligned with the chain link engaging surface of the other of said chain support pads, the hypothenuse of each triangle extending between the marginal side edge flange and the end of said chain link engaging surface closest to the center of said bracket.

2. The improved trolley bracket of claim 1 including reinforcing means secured between at least one of said marginal side edge flanges and said chain link support member for resisting bending and deformation of said chain link support member when under load.

3. The improved trolley bracket of claim 2 wherein said reinforcing means include a pair of triangular braces, each brace being rigidly secured between one of said inside surfaces of said marginal side edge flanges and the surface of said rigid chain support which is opposite said chain link engaging surface.

4. The improved trolley bracket of claim 3 wherein said chain support is a metallic bar having a width greater than the thickness of said bracket sheet metal and a thickness equivalent to the height of said marginal side edge flange whereby the bar and outer flange surfaces are flush with one another.

5. The improved trolley bracket of claim 3 wherein each of said triangular braces has a thickness equivalent to the height of said marginal side edge flange against which it is secured whereby said braces and marginal side edge flange surfaces are flush with one another.

6. In a trolley bracket for use in overhead conveyors including a first end portion including means for supporting a trolley wheel thereon, a second end portion opposite said first end and including chain link support means for supporting a link of a conveyor chain, an intermediate portion connecting said first and second end portions, and means for securing said bracket to a bracket attachment or another of said brackets, said bracket being elongated in a direction between said ends, the improvement comprising:

a trolley bracket stamped from sheet metal having upstanding marginal side edge flanges extending along at least the side edges of said second bracket end portion;

said chain link support means including a rigid chain support member extending continuously across and engaging said second bracket end portion transverse to said direction of elongation of said bracket and secured between the inside surfaces of said marginal edge flanges;

said marginal side edge flanges being interrupted at aligned positions along each side edge and having opposing, aligned, end surfaces forming said interruptions and defining a chain link receiving space;

said chain support member having a chain link engaging surface flush with a pair of said marginal side edge flange end surfaces to form a continuous chain link support surface for supporting one side edge of a chain link;

said chain link support means including means spaced in the direction of elongation of said bracket from said continuous chain link support surface and across said chain link receiving space for supporting a second side edge of a chain link;

reinforcing means secured between at least one of said marginal side edge flanges and said chain link support member for resisting bending and deformation of said chain link support member when under load;

said reinforcing means including a pair of triangular braces, each brace being rigidly secured between one of said inside surfaces of said marginal side edge flanges and the surface of said rigid chain support which is opposite said chain link engaging surface;

said means for supporting a second side edge of said chain link including a pair of spaced chain support pads, each pad secured against said second bracket end portion and an inside surface of said marginal side edge flange, each pad having a chain link engaging surface flush with one of said marginal side edge end surfaces and aligned with the chain link engaging surface of the other of said chain support pads, said pads providing a clearance space therebetween for receipt of a fastener forming part of said means for securing said bracket to a bracket attachment or another of said brackets:

said rigid chain support member and said spaced chain support pads each being formed from material which is harder and more wear resistant that said bracket sheet metal.

7. In a trolley bracket for use in overhead conveyors including a first end portion including means for supporting a trolley wheel thereon, a second end portion opposite said first end and including chain link support means for supporting a link of a conveyor chain, an intermediate portion connecting said first and second end portions, and means for securing said bracket to a bracket attachment or another of said brackets, said bracket being elongated in a direction between said ends, the improvement comprising:

a trolley bracket stamped from sheet metal and having a generally planar area at said second end of said bracket;

said chain link support means including at least one chain support pad bent outwardly from said bracket sheet metal, extending generally perpendicular to said second bracket end portion and having a chain link engaging surface extending a distance intermediate the side edges of said second bracket end portion and transverse to the direction of elongation of said bracket for supporting one side edge of a conveyor chain link;

an elongated, rigid, reinforcing bar member formed separately, secured against and abutting the surface of said chain pad opposite to said chain link engaging surface and permanently affixed to and against said second bracket end portion and extending parallel to said chain link engaging surface of said chain pad for resisting bending and deformation of said chain pad when a chain link is supported thereby and under load, said bar member supporting the full height of said chain pad above said second bracket end portion;

said chain link support means including means spaced in the direction of elongation of said bracket from said chain pad for supporting a second side edge of the conveyor chain link.

8. The improved trolley bracket of claim 7 including marginal side edge flanges extending along at least the side edges of said second bracket end portion;

said marginal edge flanges being interrupted at aligned positions along each side edge and having opposing, aligned, end surfaces forming said interruptions and defining a chain link receiving space;

said chain link engaging surface of said chain pad being aligned with a pair of said marginal side edge end surfaces which are aligned transversely across said bracket;

said reinforcing member extending continuously between and engaging opposing areas of the inside surfaces of said marginal side edge flanges.

9. The improved trolley bracket of claim 8 including a second chain support pad bent from said bracket sheet metal abutting said reinforcing member, said second chain support pad being spaced transversely across said bracket from the first of said pads and having a chain link engaging surface aligned with said chain link engaging surface of said first pad.

10. The improved trolley bracket of claim 9 wherein said reinforcing bar member is metallic and has a width greater than the thickness of said bracket sheet metal and a thickness equivalent to the height of said marginal side edge flanges whereby the bar and outer flange surfaces are flush with one another.

11. The improved trolley bracket of claim 8 wherein said means for supporting a second side edge of a chain link include a second chain support pad spaced from said one pad to define a chain link receiving space therebetween;

said second chain pad being bent from said bracket sheet metal and extending perpendicularly outwardly from said second bracket end portion;

a second reinforcing member supporting and engaging said second chain pad, and secured between and engaging one of said marginal side edge flanges and said second bracket end portion.

12. The improved trolley bracket of claim 11 including a third chain pad spaced transversely from but aligned with the first of said chain pads;

a fourth chain pad spaced transversely from but aligned with said second chain pad;

each of said third and fourth chain pads also being bent from said bracket sheet metal and extending outwardly of said second bracket end portion;

said elongated, rigid reinforcing member including a bar secured behind and abutting said first and third chain pads;

a third reinforcing member supporting and engaging said fourth chain pad and secured between and engaging a marginal side edge flange and said second bracket end portion;

said second and third reinforcing members being triangular in shape and tapering toward said marginal side edge flanges.

13. The improved trolley bracket of claim 7 including a second chain support pad bent from said bracket sheet metal abutting said reinforcing member, said second chain support pad being spaced transversely across said bracket from the first of said pads and having a chain link engaging surface aligned with said chain link engaging surface of said first pad.

14. In a trolley bracket for use in overhead conveyors including a first end portion including means for supporting a trolley wheel thereon, a second end portion opposite said first end and including chain link support means for supporting a link of a conveyor chain, an intermediate portion connecting said first and second end portions, and means for securing said bracket to a bracket attachment or another of said brackets, said bracket being elongated in a direction between said ends, the improvement comprising:

a trolley bracket stamped from sheet metal and having a generally planar area at said second end of said bracket;

said chain link support means including an elongated, rigid, metallic bar having a width greater than the thickness of said bracket sheet metal and extending continuously across, engaging and permanently affixed to said second bracket end portion transverse to said direction of elongation of said bracket to provide a continuous chain link support surface for supporting one side of a chain link; said bar being formed from metallic material which is harder and more wear resistant than said bracket sheet metal; and spaced reinforcing means permanently secured to said second bracket end portion and each engaging a surface of said elongated metallic bar opposite to said chain link support surface adjacent the side edges of said trolley bracket for resisting bending and deformation of said bar when engaging a chain link under load.

15. The improved trolley bracket of claim 14 including means spaced in said direction of elongation of said bracket from said continuous chain link support surface for supporting a second side edge of a chain link.

16. In a chain bracket for attachment to a chain for use in overhead conveyors comprising engaging means for engagement with a link of a conveyor chain to move said bracket with said conveyor chain, and means for securing a suspended object to said bracket, the improvement comprising;

a chain bracket stamped from sheet metal having upstanding marginal side edge flanges extending along at least portions of the side edges thereof;

said engaging means including a rigid chain support member extending continuously transversely across and engaging said bracket and secured between the inside surfaces of said marginal side edge flanges, said rigid chain support member being formed separately from and permanently affixed to said bracket between said marginal side edge flanges and formed from material which is harder and more wear resistant than said bracket sheet metal;

said marginal side edge flanges being interrupted at aligned positions along each side edge and having opposing, aligned, end surfaces forming said interruptions and defining a chain link receiving space;

said chain support member having a chain link engaging surface flush with a pair of said marginal side edge flange end surfaces to form a continuous chain link support surface for supporting one side edge of a chain link;

said engaging means including means spaced along said bracket from said continuous chain link support surface and across said chain link receiving space for supporting a second side edge of a chain link including a pair of spaced, triangular chain support pads, each pad secured against said bracket and an inside surface of said marginal side edge flange, each pad having a chain link engaging surface flush with one of said marginal side edge end surfaces and aligned with the chain link engaging surface of the other of said chain support pads.

17. The improved bracket of claim 16 including reinforcing means secured between at least one of said marginal side edge flanges and said chain link support member for resisting bending and deformation of said chain link support member when under load.

18. The improved bracket of claim 17 wherein said reinforcing means include a pair of triangular braces, each brace being ridgidly secured between one of said inside surfaces of said marginal side edge flanges and the surface of said rigid chain support member which is opposite said chain link engaging surface.

19. The improved bracket of claim 18 wherein said chain support is a metallic bar having a width greater than the thickness of said bracket sheet metal and a thickness equivalent to the height of said marginal side edge flange whereby the bar and outer flange surfaces are flush with one another.

20. In a chain bracket for attachment to a chain for use in overhead conveyors comprising engaging means for engagement with a link of a conveyor chain to move said bracket with said conveyor chain, and means for securing a suspended object to said bracket, the improvement comprising:
- a chain bracket stamped from sheet metal having upstanding marginal side edge flanges extending along at least portions of the side edges thereof;
- said engaging means including a rigid chain support member extending continuously transversely across and engaging said bracket and secured between the inside surfaces of said marginal side edge flanges;
- said marginal side edge flanges being interrupted at aligned positions along each side edge and having opposing, aligned, end surfaces forming said interruptions and defining a chain link receiving space;
- said chain support member having a chain link engaging surface flush with a pair of said marginal side edge flange end surfaces to form a continuous chain link support surface for supporting one side edge of a chain link;
- said engaging means including means spaced along said bracket from said continuous chain link support surface and across said chain link receiving space for supporting a second side edge of a chain link;
- reinforcing means secured between at least one of said marginal side edge flanges and said chain link support member for resisting bending and deformation of said chain link support member when under load;
- said reinforcing means including a pair of triangular braces, each brace being rigidly secured between one of said inside surfaces of said marginal side edge flanges and the surfaces of said rigid chain support member which is opposite said chain link engaging surface;
- said means for supporting a second side edge of said chain link including a pair of spaced chain support pads, each pad secured against said bracket and an inside surface of said marginal side edge flange, each pad having a chain link engaging surface flush with one of said marginal side edge end surfaces and aligned with the chain link engaging surface of the other of said chain support pads, said pads providing a clearance space therebetween for receipt of a fastener forming part of said means for securing a suspended object to said bracket;
- said rigid chain support member and said spaced chain support pads each being formed from material which is harder and more wear resistant than said bracket sheet metal.

21. In a chain bracket for attachment to a chain for use in overhead conveyors comprising engaging means for engagement with a link of a conveyor chain to move said bracket with said conveyor chain, and means for securing a suspended object to said bracket, the improvement comprising:
- a bracket stamped from sheet metal and having a generally planar area at one end of said bracket;
- said engaging means including at least one chain support pad bent outwardly from said bracket sheet metal, extending generally perpendicular to said bracket end portion and having a chain link engaging surface extending a distance intermediate said side edges of said one bracket end portion and transverse across said bracket for supporting one side edge of a conveyor chain link;
- a rigid, reinforcing member formed separately, secured against and abutting the surface of said chain pad opposite to said chain link engaging surface and permanently affixed to and against said bracket end portion and having a surface extending parallel to said chain link engaging surface of said chain pad for resisting bending and deformation of said chain pad when a chain link is supported thereby and under load, said rigid, reinforcing member supporting the full height of said chain pad above said one bracket end portion;
- said engaging means including spaced along said bracket from said chain pad for supporting a second side edge of the conveyor chain link.

22. The improved bracket of claim 21 wherein said rigid, reinforcing member is secured between and engaging one of said marginal side edge flanges and said planar bracket end portion;
- said means for supporting a second side edge of a chain link including a second chain support pad spaced from said one pad to define a chain link receiving space therebetween;
- said second chain pad being bent from said bracket sheet metal and extending perpendicularly outwardly from said one bracket end portion;
- a second reinforcing member supporting and engaging said second chain pad, and secured between and engaging one of said marginal side edge flanges and said one bracket end portion.

* * * * *

UNITED STATES PATENT AND TRADEMARK OFFICE
CERTIFICATE OF CORRECTION

PATENT NO. : 4,258,841
DATED : March 31, 1981
INVENTOR(S) : Gerald W. Gurney and Siegfried K. Weis It is certified that error appears in the above—identified patent and that said Letters Patent is hereby corrected as shown below:

Column 10, line 7, Claim 6:

"that" should be --than--

Column 12, line 55, Claim 18:

"ridigly" should be --rigidly--

Column 14, line 30, Claim 21:

After "including" insert --means--

Column 14, line 34, Claim 22:

After "reinforcing" insert --bar--

Signed and Sealed this

First Day of September 1981

[SEAL]

Attest:

Attesting Officer

GERALD J. MOSSINGHOFF

Commissioner of Patents and Trademarks